United States Patent [19]
Morishita et al.

[11] Patent Number: 5,827,621
[45] Date of Patent: Oct. 27, 1998

[54] SEALED PRISMATIC STORAGE BATTERY

[75] Inventors: Nobuyasu Morishita, Fuilldera; Shinji Hamada, Hirakata; Miho Okamoto, Sakai; Munehisa Ikoma, Shiki-gun, all of Japan

[73] Assignee: Matsushita Electric Industrial Co., Ltd., Osaka, Japan

[21] Appl. No.: 803,198

[22] Filed: Feb. 19, 1997

[30] Foreign Application Priority Data

Feb. 20, 1996 [JP] Japan ................................. 8-031563

[51] Int. Cl.⁶ ........................................................ H01M 2/02
[52] U.S. Cl. ................................................. 429/176; 429/53
[58] Field of Search ........................................ 429/176, 53

[56] References Cited

U.S. PATENT DOCUMENTS

| | | | |
|---|---|---|---|
| 3,816,181 | 6/1974 | Buckenthal | 429/176 X |
| 5,131,559 | 7/1992 | Ariyoshi et al. | 429/176 X |
| 5,425,913 | 6/1995 | Strauven et al. | 429/176 X |
| 5,510,203 | 4/1996 | Hamada et al. | 429/53 |
| 5,556,722 | 9/1996 | Narukawa et al. | 429/176 X |

*Primary Examiner*—Stephen Kalafut
*Attorney, Agent, or Firm*—Ratner & Prestia

[57] ABSTRACT

A sealed and prismatic storage battery characterized by such features as a high volumetric energy density, high compressivity and the like is provided. A battery case has an inner surface and an outer surface of each respective corner section formed of a curvature. The thickness of the corner section is 2.5 mm, a radius of curvature of the outer surface is 5.0 mm, a radius of curvature of the inner surface is 2.5 mm, and a thickness of a small thickness section between the corner section and the flat plane section is 2.0 mm. The position of the thinnest wall section coincides with a position where the radius of a circular arc forming the inner surface of the corner section crosses perpendicularly the outer side surface of the battery case.

14 Claims, 5 Drawing Sheets

SEALED PRISMATIC STORAGE BATTERY

FIELD OF THE INVENTION

The present invention relates to a prismatic and sealed storage battery and particularly relates to its battery case.

BACKGROUND OF THE INVENTION

Typical sealed prismatic storage batteries include such alkaline storage batteries as nickel-cadmium batteries and nickel-hydrogen storage batteries and also include lead-acid batteries.

The alkaline storage batteries show a higher volumetric energy density when compared with cylindrical type batteries and many are used as electric power sources for portable equipment such as headphone stereos, portable telephones and the like. On the other hand, sealed type lead-acid batteries are increasingly being used, with small ones used in portable equipment and large ones in automobiles for starting engines.

Recently, there has been a strong desire for medium-sized or large batteries having a high energy density and excellent reliability for use in home appliances and electric vehicles as mobile sources of electric power. Here, the medium-sized batteries are understood to have a capacity ranging from 10 to 100 Ah and the large batteries a capacity exceeding 100 Ah.

The number of batteries used per unit of equipment ranges on average from several units to several hundred units. Medium-sized and large batteries of non-sealed type nickel-cadmium batteries and lead-acid batteries are usually used for an energy storage purpose, UPS and the like, but some inconveniences exist by the necessity of maintenance by adding distilled water periodically during the life span of the batteries.

As a result, there has been a strong desire for maintenance-free batteries produced by employing a sealed structure in mobile sources of electric power for home appliances, electric vehicles and the like.

A typical prior art prismatic battery is illustrated in FIG. 4.

In FIG., 4, each respective electrode group 31 is composed of positive electrodes 32 and negative electrodes 33 that are alternately superimposed one upon another with a separator (not shown in FIG. 4) inserted between the electrodes and then the electrode group 31 thus constructed is contained inside of a battery case 34.

A positive pole 35 and a negative pole 36 are connected to the electrode group 31, respectively, and electric energy is drained to the outside through the positive pole 35 and negative pole 36.

A cover 38 is provided with a safety vent 37 in addition to the positive pole 35 and negative pole 36.

The battery case of the foregoing batteries is made of metal or resin. In either case, the battery case is required to have high compressivity.

When the internal pressure of the battery case 34 is increased, each respective side or end surface forming the prismatic battery case is exposed to outward mechanical stresses.

Specifically, the outward mechanical stresses concentrate to corner sections where two flat plane sections forming a prismatic battery case meet each other since an outward bending moment is produced with the corners serving as the center of the bending moment.

In order to improve the compressivity by overcoming the foregoing mechanical stresses, it has been considered to increase the thickness of the corner sections.

Also, employing a curvature formed of concentric arcs for both the inner surface 39 and outer surface 40, both together comprising the corner section 41 as shown in FIG. 5. has been considered as a solution to the foregoing problem.

In this case, the thickness of the flat plane section 43 is made the same as that of the corner section 41.

However, it becomes difficult for a sealed prismatic storage battery using a battery case with an increased case thickness to dissipate the heat produced within the battery efficiently to the outside, resulting in deterioration of the battery's performance.

In addition, when the battery case is produced by molding, the case is not readily formable and also the amount of material used tends to increase, thus ending up with numerous drawbacks in terms of costs.

On the other hand, when a sealed prismatic storage battery is constructed so that each respective corner section thereof is made of an outer surface and an inner surface, each of which has a curvature formed of concentric arcs, and especially the inner surface may have a sufficiently large radius of curvature, the internal effective volume of the battery case will be decreased with a resulting reduction in the volumetric energy density of the battery.

Furthermore, when an almost rectangular prism-like electrode group composed of square-shaped electrodes, which are superimposed one upon another, is placed in the foregoing battery case, the curved corner sections of the battery case are pressed against the edges of the electrode group, sometimes inflicting damages on the electrode group and causing the edges of positive or negative electrodes to penetrate separators, thereby bringing about the danger of electrical short circuiting.

With the foregoing sealed prismatic storage battery with a battery case that has specified thicknesses for flat plane sections and corner sections, each respective flat plane section forming the prismatic battery case is exposed to an outward stress as the internal pressure in the battery case increases. Under this state, while each respective flat plane section being subjected to a tensile stress, each respective corner section, where two flat plane sections meet each other, is exposed to a bending moment that works outward from the center of the corner section. Therefore, the stress is concentrated in the center of the corner section, and even when the inner surface of the corner section has a sufficiently large radius of curvature, the strength of the corner section is not great enough and results in insufficient compressivity.

SUMMARY OF THE INVENTION

The present invention provides a sealed prismatic storage battery having a high volumetric energy density and using a battery case with a high compressivity A sealed prismatic storage battery in accordance with an exemplary embodiment of the present invention comprises a prismatic battery case having an opening, with electrodes and electrolyte, both contained in the foregoing battery case, and a cover whereby the opening is closed by sealing. The aforementioned battery case has a plurality of almost flat plane sections, corner sections situated between two of the plurality of almost flat plane sections and junctions existing between the corner sections and respective flat plane sections. At least the inner surface of each respective corner section has a curvature and the thickness of the junctions is smaller than that of the flat plane sections and corner sections.

In the structures as described above, it is particularly preferred that the aforementioned electrodes comprise a plurality of positive electrodes and negative electrode plates, and separators placed between positive electrodes and negative electrodes.

The aforementioned cover is particularly preferred to have a safety vent.

Each of the aforementioned corner sections is particularly preferred to have a curving outer surface.

Each respective section between the foregoing corner sections and junctions and also between the foregoing junctions and flat plane sections is particularly preferred to change continuously in thickness.

It is particularly preferred that the position where the foregoing junction becomes smallest in thickness coincides with the position of the foregoing flat plane sections where the radius of the circular arc forming the inner surface of the foregoing corner section crosses the outer surface of the flat plane section perpendicularly.

It is preferred that the thickness of the foregoing junction is larger than one half of the smallest thickness of the flat plane section as described above. Further, when a battery case has a radius of curvature R1 in its outer surface, a radius of curvature R2 in its inner surface, a thickness B1 in the thinnest part of a junction between a corner section and a flat plane section and a thickness B2 in the thinnest flat plane section of two or three flat plates that form a corner section of the battery case, it is most desirable that the following inequality be satisfied:

$$R1>R2+B1>0.75R1>B2>B1>0.5B2$$

When a battery case is structured as described above, it is possible to prevent stresses from concentrating on a corner section of a battery case, which is composed of a plurality of almost flat plane sections.

Therefore, stresses due to a tensile stress and bending moment can be prevented from concentrating only on a small area in the center of the corner section. Instead, the stresses can be dispersed to larger areas around the place where the thickness is made small.

As a result, even if a battery case has the same thickness throughout or a smaller thickness, the battery case can be made to show improved compressivity.

According to the structures as described above, a reduction in thickness for the corner sections of a battery case is made possible, thereby making it possible to increase the volume for accommodating a rectangular prismlike electrode group and achieve a battery with a high volumetric energy density.

Furthermore, since an overall reduction in thickness for the battery case is achieved, it has become possible for the heat produced from the electrode group to dissipate efficiently to the outside of the battery. As a result, the charge and discharge efficiency of the electrode group is enhanced.

In addition, the prevention of deterioration in electrode plates due to dissolving and the like is achieved, thus making it possible to achieve a long life storage battery.

Figure 1:
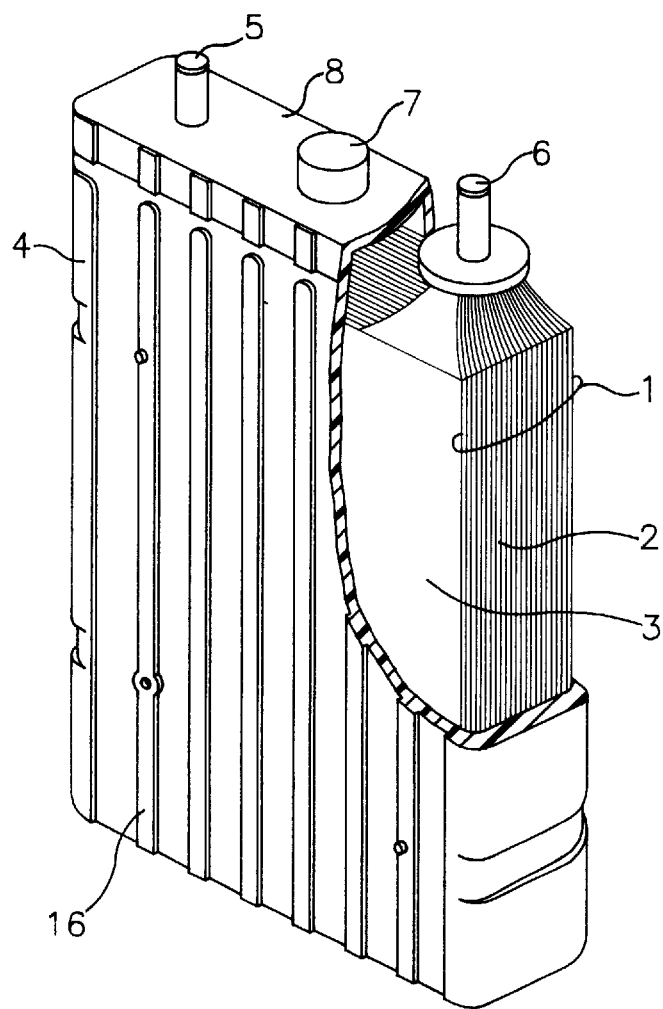
FIG. 1 is a perspective view of a sealed prismatic storage battery in accordance with an exemplary embodiment of the present invention.

| Key to Reference Numerals | |
|---|---|
| 1 | Electrode Group |
| 2 | Positive Electrode Plate |
| 3 | Negative Electrode Plate |
| 4 | Battery Case |
| 5 | Positive Pole |
| 6 | Negative Pole |
| 7 | Safety Vent |
| 8 | Cover |
| 9 | Inner Surface |
| 10 | Outer Surface |
| 11 | Corner Section |
| 12 | Junction Section |
| 13 | Plan View |
| 16 | Projected Section |

DETAILED DESCRIPTION OF PREFERRED EMBODIMENTS

Next, a sealed prismatic storage battery will be explained in some exemplary embodiments of the present invention with reference to the drawings.

FIG. 1 is a perspective view of a sealed prismatic storage battery in an exemplary embodiment of the present invention. In FIG. 1, a sealed prismatic storage battery comprises electrode group 1, a battery case 4 containing the electrode group 1, an electrolyte (not shown in FIG. 1) filled in the battery case 4 with which the electrode group 1 are impregnated, and a cover 8 arranged to cover an opening of the battery case 4.

The electrode group 1 is prepared as follows:

A positive electrode 1 is a nickel positive electrode plate with a drainage capacity of 10 Ah per plate, which is prepared by filling an active material of nickel hydroxide powder in a foam-like nickel porous structure and then by rolling/cutting to specified dimensions.

A negative electrode 3 is a negative electrode plate of a hydrogen absorbing alloy having a drainage capacity of 13 Ah per plate, which is prepared by coating a punching metal with a mixture of a binder and hydrogen absorbing alloy powder which has a composition of $MmNi_{3.6}Co_{0.7}Mn_{0.4}Al_{0.4}$ (Mm stands for miscellaneous metal) that can absorb/emit hydrogen electrochemically and then by rolling/cutting to specified dimensions. These positive and negative electrodes are wrapped in a sack-like separator individually, and 10 positive electrodes and 11 negative electrodes of these separator wrapped electrodes are alternately combined to comprise an electrode group 1. The electrode group 1 is made so that the thickness thereof may occupy about 5% of the inner thickness of the battery case 4.

Next, each respective positive electrode 2 is connected to a positive pole 5 and each respective negative electrode 3 is connected to a negative pole 6. Both the positive and negative poles are provided on the cover 8.

The electrode group thus constructed is then placed in the battery case 4.

The positive pole 5 and negative pole 6 are made of copper and nickel, respectively.

Next, alkaline electrolyte in a volume of 180 $cm^3$ is poured in the battery case 4.

After that, the opening of the battery case 4 is closed by sealing with the cover 8 which is provided with a safety vent 7 (an actuating pressure of 15 kg/cm$^2$).

Thus, a battery A is completed.

There are many projections 16 running vertically that are formed on the outer side surfaces of the battery case 4. The height of the projections is about 1.5 mm.

Further, the completed battery is subjected to an initial charging/discharging process (charging at 10 A for 15 hours and discharging at 2.0 A until the battery voltage decreases to 1.0 V).

Figure 2:
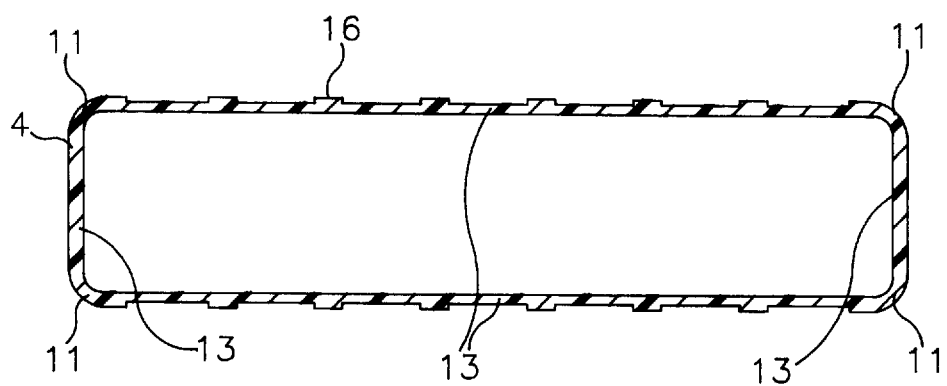
FIG. 2 shows part of a cross-sectional view of the battery case used in the prismatic storage battery of FIG. 1.
Figure 3:
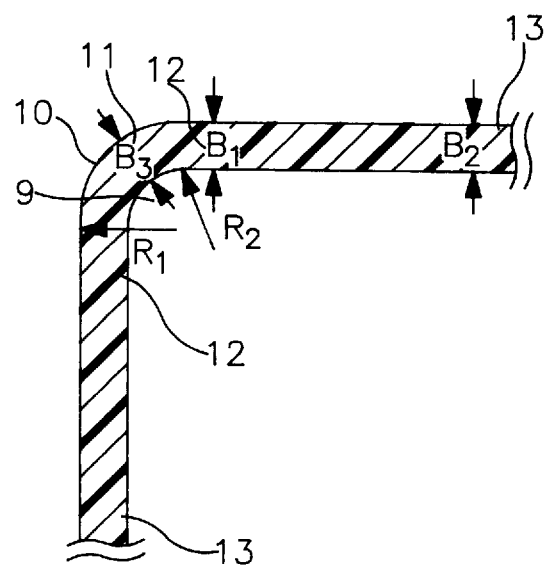
FIG. 3 is an enlarged cross-sectional view of part of the battery case as shown in FIG. 2.
Figure 4:
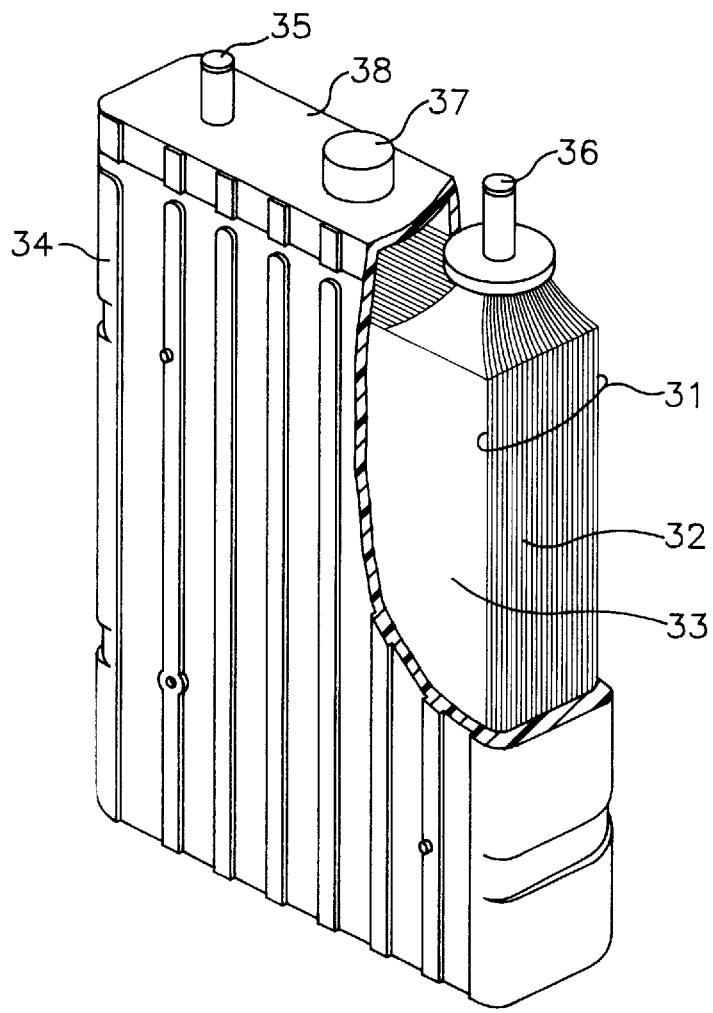
FIG. 4 is a perspective view of a prior art sealed prismatic storage battery.

The battery, thus prepared, is limited to 100 Ah in the drainage capacity by the positive electrode, FIG. 2 is a cross-sectional view of the battery case 4 and FIG. 3 is an enlarged cross-sectional view of one of the corner sections of the battery case 4.

The battery case in the present exemplary embodiment is of a rectangular prism-like configuration and each respective corner section 11 is formed of an outer side surface and an inner side surface, each comprising a curved surface. The minimum thickness B2 of any two or three flat plane sections 13 that meet one another at a corner section 11 measures 2.5 mm, a radius of curvature R1 of the outer surface of the corner section 11 is 5.0 mm, a radius of curvature R2 of the inner surface of the corner section 11 is 2.5 mm, a thickness B1 of the thinnest part of a junction section 12 between the corner section 11 and the flat plane section 13 measures 2.0 mmn and a thickness B3 of the thickest part of the corner section 11 measures 2.5 mm.

Each respective thickness of the areas between the corner section 11 and the junction and between the junction section 12 and a flat plane section 13 changes continuously. In addition, the flat plane sections 13 have projections 16 formed at the specified positions thereof. These projections 16 contribute to increasing the mechanical strength of the flat plane sections 13.

Thus, a sealed prismatic storage battery A has been completed.

Each respective curvature center of the radius of curvature R1 of the battery case's outer side surface 10 and the radius of curvature R2 of the battery case's inner side surface 9 is not necessarily at the same position. The place on a junction where the thickness B1 of the junction section 12 is smallest coincides with the place where the radius of a circular arc forming the inner side surface 9 of a corner section 11 crosses perpendicularly the inner side surface of a flat plane section 13.

The battery case 4 is made of resin.

Figure 5:
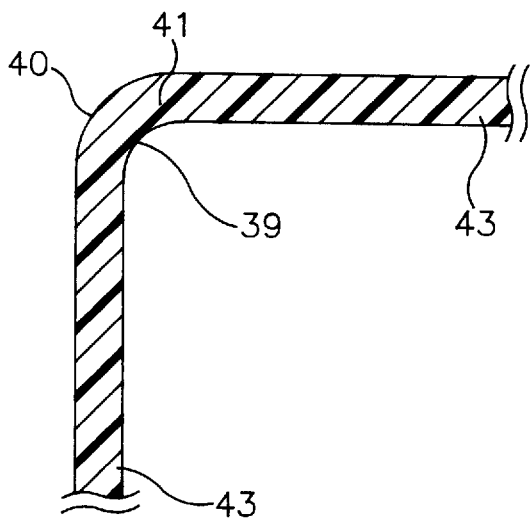
FIG. 5 is an enlarged cross-sectional view of part of the battery case for an ordinary sealed prismatic storage battery.

According to the same method as described above, sealed prismatic storage batteries B through L of various battery case configurations have been prepared. The batteries F, J and L have square corners on the outer side surfaces of their battery cases . The batteries D and K have been prepared using a prior art battery case, as shown in FIG. 5.

Table 1 shows the dimensions of the battery cases used in these batteries.

TABLE 1

| | Thickness of Battery Case at Various Places | | | | | Measurement Results Compressivity |
|---|---|---|---|---|---|---|
| | R1 | R2 | B1 | B2 | B3 | kg/cm$^2$ |
| Battery A | 5.0 | 2.5 | 2.0 | 2.5 | 2.5 | 12.0 |
| Battery B | 5.0 | 3.5 | 2.0 | 2.5 | 2.5 | 10.0 |
| Battery C | 5.0 | 1.5 | 2.0 | 2.5 | 3.5 | 9.0 |
| Battery D | 5.0 | 2.5 | 2.5 | 2.5 | 2.5 | 6.0 |
| Battery E | 5.0 | 2.5 | 1.2 | 2.5 | 2.5 | 5.0 |
| Battery F | — | 2.5 | 2.0 | 2.5 | >2.0 | 8.0 |
| Battery G | 4.5 | 2.5 | 1.4 | 2.5 | 2.0 | 8.0 |
| Battery H | 4.0 | 2.0 | 1.7 | 2.0 | 2.0 | 7.5 |
| Battery I | 4.0 | 2.0 | 0.9 | 2.0 | 2.0 | 4.0 |
| Battery J | — | 2.0 | 1.7 | 2.0 | >1.7 | 7.0 |
| Battery K | 5.0 | 2.0 | 3.0 | 3.0 | 3.0 | 8.0 |
| Battery L | — | 2.5 | 2.5 | 2.5 | >2.5 | 5.0 |

As indicated in the above table, a series of compressivity tests have been conducted using batteries A through L.

The compressivity test method employed in the above is as follows:

Charge a battery for 12 hours at 10 A and then let the battery stand for one hour, and further overcharge the battery at 5 A until cracks or fractures are produced on the corner sections of the battery where stresses are concentrated. Measure the internal pressure at this time. The internal pressure is measured by an internal pressure sensor attached to the battery case in advance, and the measured internal pressure values are also indicated in Table 1.

Cracks were observed with the sealed prismatic storage battery A when the internal pressure reached 12 kg/cm$^2$.

The battery B was cracked under an internal pressure of about 10 kg/cm$^2$.

The battery C was cracked under an internal pressure of about 9 kg/cm$^2$.

The battery D was cracked under an internal pressure of about 6 kg/cm$^2$.

The battery E was cracked under an internal pressure of about 5 kg/cm$^2$.

The battery F was cracked under an internal pressure of about 8 kg/cm$^2$.

The battery G was cracked under an internal pressure of about 8 kg/cm$^2$.

The battery H was cracked under an internal pressure of about 7.5 kg/cm$^2$.

The battery I was cracked under an internal pressure of about 4 kg/cm$^2$.

The battery J was cracked under an internal pressure of about 7 kg/cm$^2$.

The battery K was cracked under an internal pressure of about 8 kg/cm$^2$.

The battery L was cracked under an internal pressure of about 5 kg/cm$^2$.

Table 1 reveals that batteries having a larger thickness B1 for a junction than a thickness B2 for a flat plane section and also larger than a thickness B3 for a corner section, (such as batteries A, B, C, G and H) show an improvement in compressivity.

In Table 1, the battery A shows the most enhanced compressivity. With the battery A, the existence of a section of little thickness in the junction section between the curved part of a corner section and a flat plane section contributes to dispersing the stress not only to the corner section, but also to the section with less thickness. Therefore, the stress that used to concentrate on the corner section in the prior art is dispersed to larger areas. As a result, the compressivity of the battery A has been improved when compared with that of a prior art battery K, despite the fact that the thickness of various sections of the battery A is reduced.

The compressivity of the battery B is larger than that of the prior art battery D, which does not have a section of little thickness but one smaller than that of the battery A. The reason for the above is that a relatively large stress is imposed on the section of little thickness of the junction section without the uniform dispersion of stress taking place in the curved section and section of little thickness, since the radius of curvature R2 of the inner surface of the corner section is a little larger than that of the battery A.

In other words. the radius of curvature R2 of the inner surface of the corner section should satisfy an inequality (1) as follows:

$$R1 > R2 + B1 > B2 \tag{1}$$

The compressivity of the battery C is larger than that of the battery D, which does not have a section of little thickness, but one smaller than that of the battery A.

The reason for the above is that a relatively large stress is imposed on the corner section without the uniform dispersion of stress taking place in the curved section and section of little thickness since the radius of curvature R2 of the corner section is a little smaller than that of the battery A.

In other words, the radius of curvature R2 of the inner surface of the corner section should satisfy an inequality (2) as follows:

$$R1 > R2 + B1 > 0.75R1 > B2 \tag{2}$$

The battery H has been designed to have a smaller thickness B2 for its flat plane section than the thickness of the prior art battery D. Since the junction's thickness B1 is smaller than B2, the stress imposed is dispersed to a larger area. As a result, the compressivity of the battery H has been improved when compared with that of the prior art battery D despite the fact that the thickness of the battery case is reduced.

In contrast, the compressivity of the batteries D, E and I is markedly reduced.

The battery D has the thickness B1 for the junction section, the thickness B2 for the flat plane section and the thickness B3 for the corner section, all made equal to one another, and the tensile stress and curvature moment, which develop as the internal pressure of the battery D increases, are concentrated on a small area of the curved surface of the corner section, resulting in cracking despite the relatively low internal pressure produced in the battery D.

The compressivity of the battery E is further reduced from that of the battery D.

The reason for the above is in that the thickness B1 for the junction section of the battery E is extremely small and stress has been concentrated on the section of little thickness.

The compressivity of the battery I is further reduced from that of the battery H.

The reason for the above is in that the thickness B1 for the junction section of the battery I is extremely small when compared with the wall thickness B of the battery H and stress has been concentrated on the section of little thickness.

Next, the performance of the batteries F, J and L, all of which have square corner sections on the outer surfaces of each respective battery case, will be examined by comparing one with the other.

The compressivity of the batteries F and J, wherein the junction thickness B1 is made smaller than the thickness B2 of the flat plane section, is higher than that of the battery L having the same thickness for both the junction thickness B1 and the thickness B2 of the flat plane section.

When the thickness B2 of the flat plane section 13 is increased, the resulting compressivity is improved. However, the inside volume of the battery case 4 that can afford to accommodate an electrode group will be reduced, thereby causing the drainage capacity of the battery to be reduced tremendously and also making it difficult for the heat produced in the battery to dissipate to the outside. Therefore, it is not desirable to increase the thickness B2 of the flat plane section 13.

Also, as the radius of curvature R2 of the inner surface 9 of the battery case 4 increases, the extent of protrusion of the corner sections towards the inside of the battery is increased, thereby causing the volume that an electrode group can occupy to be reduced and decreasing the drainage capacity of the battery.

Therefore, it is not desirable to overly increase the radius of curvature B2 of the inner surface 9 of the battery case 4.

From the evaluation results as described above, it can be concluded that a battery case should comprise a plurality of almost flat plane sections, corner sections formed of the plurality of almost flat plane sections and junctions situated between each respective corner section and flat plane section, and the thickness of the junctions should be smaller than that of the flat plane sections and corner sections.

Furthermore, the battery case to be employed should be a sealed prismatic battery case having corner sections, each of which is formed of an outer surface and an inner surface both comprising a curvature. It is most preferred that the radius of curvature R1 of the battery case's outer surface, the radius curvature R2 of the battery case's inner surface, the thickness B1 of a section of little thickness of a junction section situated between a corner section and a flat plane section and the thickness B2 of two or three flat plane sections forming corner sections satisfy the following inequality (3):

$$R1 > R2 + B1 > 0.75R1 > B2 > B1 > 0.5B2 \tag{3}$$

In addition, the place where the wall thickness becomes smallest, as mentioned above, should coincide with the place where the radius of a circular arc forming an inner surface of a corner section, crosses the flat plane on the outer side surface of the battery case.

There are dangers of having the edges of the electrode group pressed against the inside surfaces of the corner sections and even having them damaged in a battery using a battery case that has the inner and outer surfaces of the corner sections formed of concentric circular arcs.

Furthermore, the edges of positive electrodes or negative electrodes may break through the separators with a resulting danger of short-circuiting the electrodes.

As opposed to the above, the battery case of a prismatic storage battery of the present invention has sections of little thickness in the corner sections thereof, thereby eliminating the possibilities of pressing the edges of the electrode group against the inner surfaces of the battery case and the possible dangers of short-circuiting.

Furthermore, even if the structures in the foregoing exemplary embodiments do not have any curvatures on the outer surfaces, the same effects as achieved with the present exemplary embodiment can be obtained provided that the inner surface configurations of the corner sections of the battery case used are the same as the ones of the present exemplary embodiment.

In addition, it is particularly preferred that the sealed prismatic storage batteries of the present invention are alkaline storage batteries such as a nickel-hydrogen battery or a nickel-cadmium battery, and a lead-acid battery. Also, it is particularly preferred that the sealed prismatic storage batteries of the present invention are medium-sized and large storage batteries with an energy density exceeding 10 Ah.

As described above, the seated prismatic storage battery of the present invention is characterized by showing the following effects:

(1) Achieving a high degree of compressivity without reducing the drainage capacity of a storage battery.

(2) Eliminating the possibilities of the battery case's inner surfaces being pressed against the edges of the electrode group and resultant dangers of short-circuiting the electrodes by employing a battery case wherein the inner and outer curved surfaces at corner sections are not formed of concentric circular arcs and sections of little thickness are provided.

(3) Making it possible to make the battery case's wall thickness small, thereby facilitating the dissipation of the heat produced in a storage battery to outside of the battery and consequently contributing to the suppression of the battery's heat generation.

The foregoing effect will be particularly multiplied by producing the battery case using plastic materials that are easy to mold, inexpensive and low in thermal conductivity.

(4) Producing sealed prismatic storage batteries of medium size and large size showing a high energy density and all the advantages of the foregoing (1) through (3).

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed:

1. A sealed prismatic storage battery comprising:
   a battery case including:
      a plurality of flat plane sections;
      a corner section situated between each flat plane section of said plurality of flat plane sections;
      a junction section situated between said corner section and said each flat plane section said junction section having a thickness that is smaller than the thickness of said flat plane section and the thickness of said corner section; and
      an electrode group and an electrolyte contained in said battery case.

2. A sealed prismatic storage battery according to claim 1, wherein said flat plane section has a substantially flat plane shape.

3. A sealed prismatic storage battery according to claim 1, wherein said prismatic battery case has a substantially rectangular prism shape.

4. A sealed prismatic storage battery according to claim 3, wherein a position of the thinnest section of said junction section coincides with a position where a radius of a circular arc forming an inner surface of said corner section crosses perpendicularly an inner surface of said flat plane section.

5. A sealed prismatic storage battery according to claim 1, wherein a thickness of said junction section is larger than ½ of the smallest thickness of said flat plane section.

6. A sealed prismatic storage battery according to claim 1, wherein said electrode group includes a plurality of positive and negative electrode groups and a separator placed between said positive and negative electrode groups of said plurality of electrode groups.

7. A sealed prismatic storage battery according to claim 1, wherein said cover has a safety vent.

8. A sealed prismatic storage battery according to claim 1, wherein said battery case is made of at least one of molded plastics and molded metals.

9. A sealed prismatic storage battery according to claim 1, wherein said corner section has an outer surface, said outer surface having a curvature.

10. A sealed prismatic storage battery according to claim 9, wherein a thinnest place of said junction section coincides with a place where a radius of a circular arc forming an inner surface of said corner section crosses perpendicularly an inner outer surface of said flat plane section.

11. A sealed prismatic storage battery according to claim 9, wherein a thickness of said junction is larger than ½ of the thickness of said flat plane section.

12. A sealed prismatic storage battery according to claim 8, wherein a radius of curvature R1 of said outer surface of said corner section, a radius of curvature R2 of said inner surface of said corner section,
   a thickness B1 of said junction section, and
   a thickness B2 of said flat plane section satisfy the following inequality:

$$R1>R2+B1>0.75R1>B2>B1>0.5B2.$$

13. A sealed prismatic storage battery according to claim 1, wherein a thickness of a first section between said corner section and said junction section changes continuously along a length of said first section and a thickness of a second section between said junction section and said flat plane section changes continuously along a length of said second section.

14. A sealed prismatic storage battery according to claim 1, wherein said corner section has a curvature at least on the inner surface thereof.

* * * * *